Jan. 6, 1925.
P. A. FRIMAND
1,521,614
MILKING MACHINE
Filed Sept. 5, 1922 3 Sheets-Sheet 3
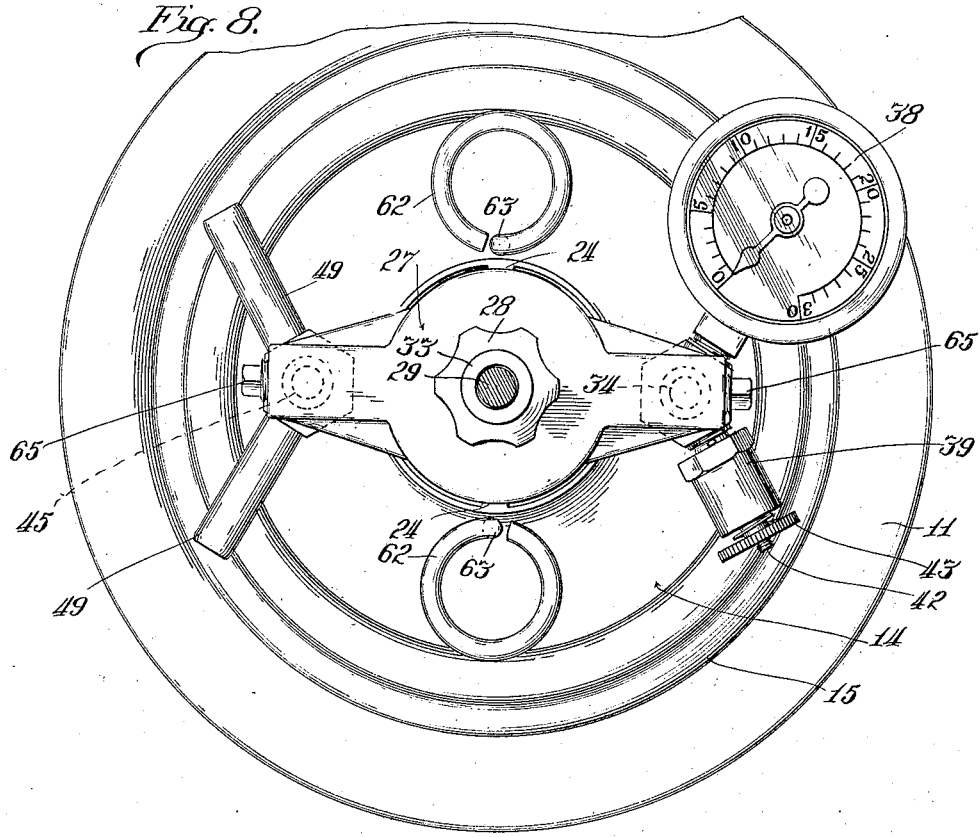
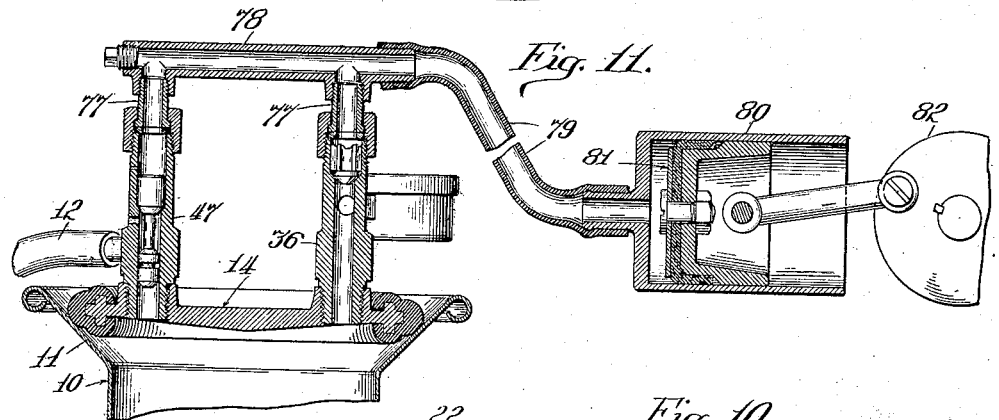
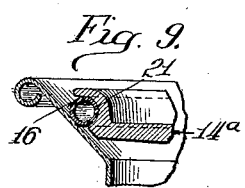
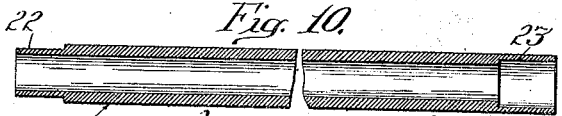

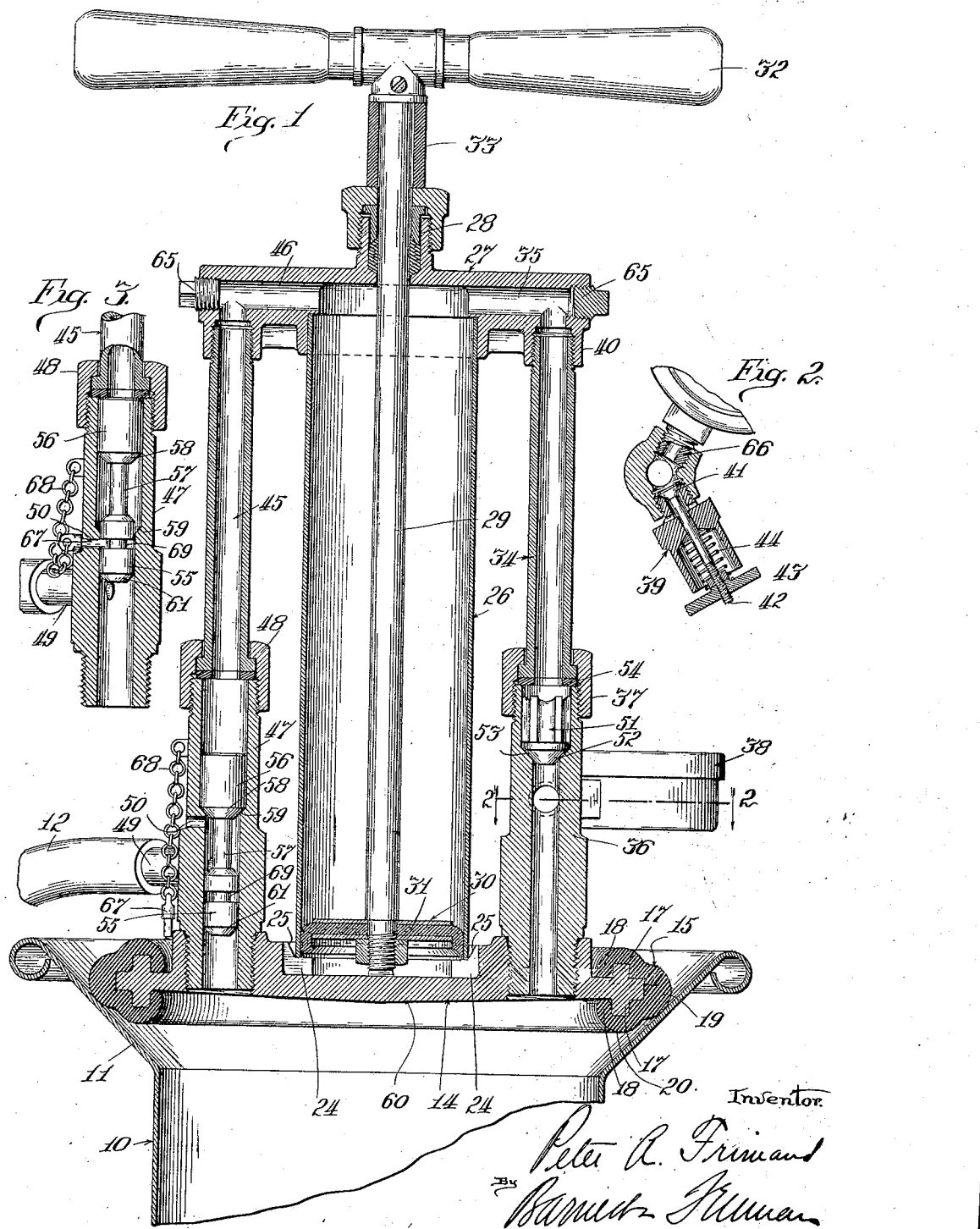

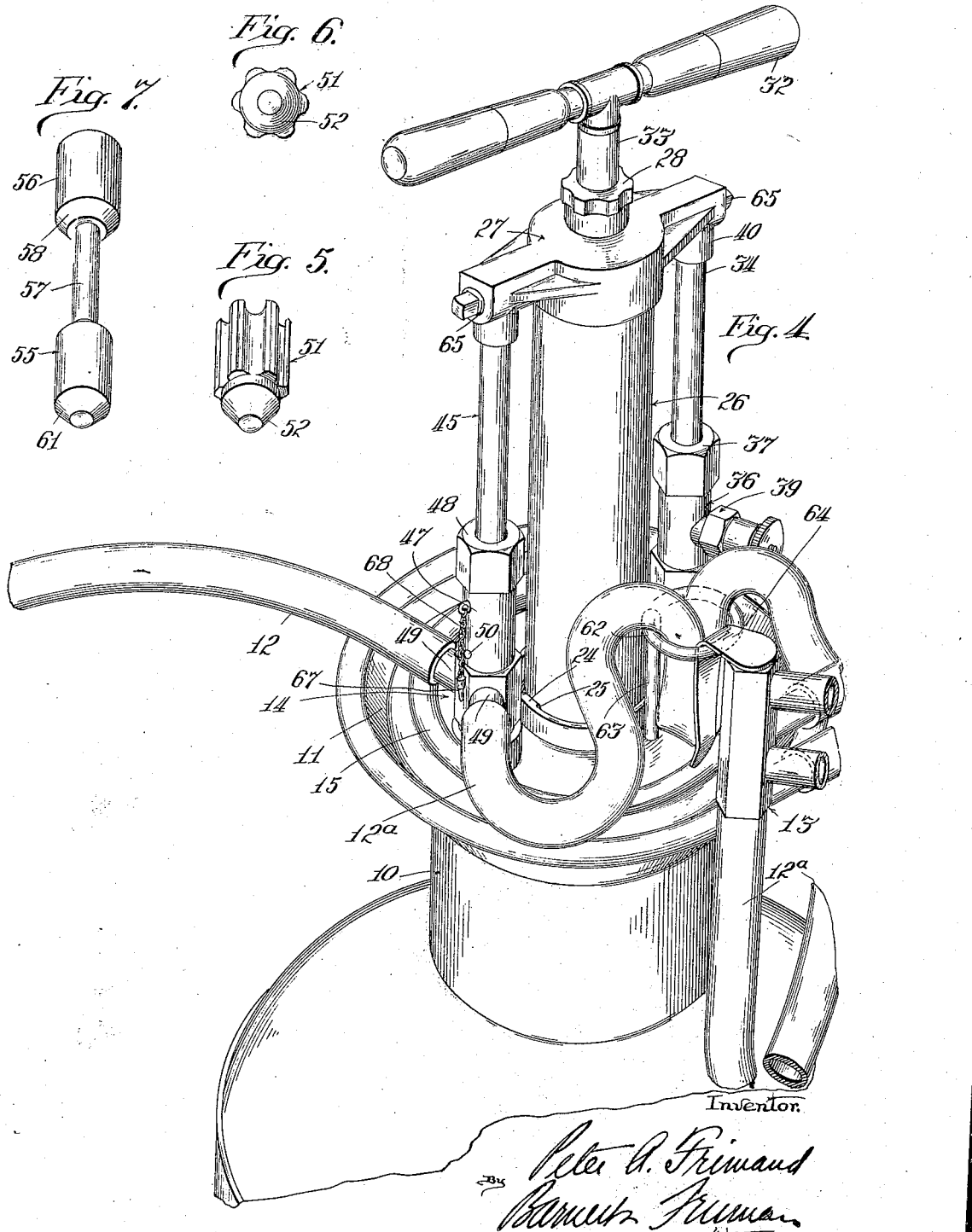

Patented Jan. 6, 1925.

1,521,614

UNITED STATES PATENT OFFICE.

PETER A. FRIMAND, OF WILMETTE, ILLINOIS.

MILKING MACHINE.

Application filed September 5, 1922. Serial No. 586,278.

*To all whom it may concern:*

Be it known that I, PETER A. FRIMAND, a citizen of the United States, residing at Wilmette, in the county of Cook and State of Illinois, have invented certain new and useful Improvements in Milking Machines, of which the following is a specification.

My invention relates to a milking machine and particularly to a milking machine of the type operated through the creation of a vacuum in the milk receptacle, to the action of which the cow's udder is subjected at intervals so that the milk is withdrawn from the cow intermittently with periods of rest between successive suction impulses.

The principal object of the invention is to provide a milking machine of this type which will be inexpensive to manufacture, small and compact in structure for convenience in handling and to minimize cost of packing and transportation, and simple in the mechanisms employed so that durability, reliability of operation and ease of repair will be insured even when the machine is in the hands of those of small mechanical experience, as is likely to be the case with a milking machine.

A further object is to so construct the milking machine that it can be readily taken apart and cleaned and thus kept in sanitary condition.

A further object is to provide a milking machine which by simple changes of certain parts of the apparatus can be adapted for operation either by hand or by a motor.

A further object is to so construct the machine that, when adapted for manipulation by hand, it may be operated with a minimum of effort.

The invention consists in the new and improved constructions, arrangements and devices to be hereinafter described and claimed for carrying out the above stated objects and such other incidental objects as will be referred to in the accompanying description of the preferred embodiment of the invention shown in the accompanying drawings.

In the drawings,

Fig. 1 is a vertical sectional view of the milking machine (omitting the udder attachments) shown as operatively supported on an ordinary milk can.

Fig. 2 is a sectional plan of a safety valve to prevent creation of too high a vacuum in the apparatus.

Fig. 3 is a fragmentary sectional view of the vibrator mechanism as shown at the l hand side of Fig. 1 but with the valve in its raised position.

Fig. 4 is a view, in perspective, of the apparatus and upper part of the milk can.

Fig. 5 is a perspective view of the controlling valve in the exhaust conduit.

Fig. 6 is a view of the lower end of the valve of Fig. 5.

Fig. 7 is a view, in perspective, of the vibrator valve.

Fig. 8 is a plan view of the apparatus.

Fig. 9 is a fragmentary sectional view illustrating a modified form of gasket for sealing the milking machine structure on the milk can.

Fig. 10 is a fragmentary, longitudinal sectional view of the tubing from which this gasket is made, and Fig. 11 is a fragmentary sectional view of a milking machine, in accordance with my invention, adapted for operation by a motor instead of by hand as is the case with the machine shown in Figs. 1 to 8 inclusive.

The milking machine of this invention is intended to be placed upon and in air tight relation with a milk receptacle of any suitable character. Preferably the machine is designed, as shown in the drawings, so that it may be placed within and be supported by the flaring mouth of the ordinary milk can. In the drawings, 10 designates the neck of the milk can and 11 the flaring mouth of the same. 12 is the milk conduit, preferably a rubber tube, to which may be secured any suitable form of udder attachment or teat cluster, such, for example, as that shown at 13 in Fig. 4. The pumping and vibrating mechanism with which my present invention is concerned, is preferably constructed as follows:

14 is a base plate which is circular and provided either with the resilient solid gasket 15, as shown in Fig. 1, or with the tubular gasket 16 shown in Figs. 9 and 10.

In the arrangement shown in Fig. 1 the base plate is formed with upper and lower circumferential ribs 17 adapted to be engaged by lips 18 on the gasket, the latter being formed with an outwardly projecting rib 19 and a downwardly projecting rib or enlargement 20. When the milking machine is first placed on the milk can rib 20 does not bear against the mouth 11 of the can but as the air is exhausted from the can the gasket is flexed so that contact with the can takes place along the rib 20. This arrangement insures a proper seal between the milking machine and the can. In the arrangement shown in Figs. 9 and 10, the edge of the base plate 14ª is formed with a groove 21 in which is seated the tubular gasket 16. This gasket is preferably made by bending a straight piece of rubber hose, such as is shown in Fig. 10, into circular form and inserting the reduced end 22 of the tube into the enlargement 23 at the other end thereof and cementing these ends together.

Referring again to Figs. 1 to 8, inclusive, the base plate 14 is formed on its upper surface with spacing lugs 24, preferably formed with oblique centering surfaces 25, on which lugs is supported the cylinder 26 of the exhausting pump, the upper end of the cylinder being held in place by a head 27, centrally perforated and provided with a stuffing box 28 for the piston rod 29 of the pump piston 30. The latter is provided with a leather 31 cupped in the downward direction so that on the up or back stroke of the piston above it can be expelled from the pump cylinder. The piston rod 29 is provided with a handle 32 and preferably a rubber cushion or spring 33 is interposed between the handle and stuffing box 28. An exhausting conduit is interposed between the head 27 and the base 14 consisting preferably of a pipe section 34 tapped into the under side of the head 27 and communicating with a transverse port 35 therein, a pipe section 36 screwed into a boss in the base 14 and a union 37 connecting said pipe sections. 38 is a vacuum gauge secured to pipe section 36 and 39 is a safety valve tapped into pipe section 36, the safety valve 39 comprising an inwardly opening valve body 41 (Fig. 2), the stem of which is threaded at 42 for an adjusting nut 43 between which and the casing of the valve is arranged a coiled spring 44.

A vibrator conduit is arranged on the other side of the pump casing from the exhaust conduit and consists of a pipe section 45 tapped into the head 27 in communication with a duct 46 therein leading to the pump casing, a pipe section 47 tapped into the base 14, and a union 48. The pipe section 47 has a nipple 49 for the milk conduit 12, and above this nipple, it is formed with one or more air inlet openings 50.

Valves are arranged in the exhaust and vibratory conduits which are preferably of the floating type, being moved in an upward direction through vacuum created in the pump cylinder on the down stroke of piston 30, and in the reverse direction by gravity and the increase of pressure in the pump cylinder on the upstroke of the pump. The exhaust valve 51 is a fluted cylindrical body having a conical lower end 52 (Figs. 5 and 6) which bears against a seat 53 formed in the upper portion of the exhaust pipe section 36. A washer 54, to serve as a buffer, may be arranged above the valve although this is not necessary. The vibrator valve is preferably a double piston valve consisting of a lower piston 55, an upper piston 56, of larger diameter, and a connecting stem 57. The valve is held in its normal or lower position by contact of the conical lower end 58 of the upper cylinder with a seat 59 formed in the pipe section 47. When in this position the milk conduit is open to the atmosphere through port 50. With the valve raised, through operation of the exhaust pump, to its upper position, as shown in Fig. 3, the milk conduit is in communication with the milk receptacle 10 and the air inlet port 50 is closed.

The opening through the base 14 of the exhaust and vibrator conduits are arranged preferably near the periphery of the base and the lower surface 60 of the base is convex so that any condensed milk vapors tend to flow away from these openings. This arrangement is to insure against milk vapors being drawn into the pump. The lower end of valve piston 55 is tapered, as indicated at 61, so as to deflect downwardly the milk entering the apparatus from the milk conduit 12. Where the apparatus is designed for the milking of two cows at one time, which is the arrangement shown in the drawings, the milk conduits 12 and 12ª (Fig. 4) are arranged at angles to each other so that the milk streams do not impinge directly one against the other. Arranged above the base 14 are a pair of ring-like structures 62 supported from the base by uprights 63, the ring and the upright being formed preferably from a single piece of wire suitably bent. The rubber tubes forming the milk conduits may be crimped and the crimped portion passed through the rings 62 (as shown at the right hand side of Fig. 4). The udder attachment 13 is preferably provided with a clip 64 by which the device may be hung on the ring 62. The outer ends of the ports 35 and 46 are closed by screw plugs 65 of the same diameter as the nipple 66 of the vacuum gauge 38 so that by putting the vacuum gauge in the place of one of the plugs the exhausting capacity of the pump may be tested. To hold the vibrator valve in its upper position while the teat cups are put in place on the cow a pin 67 preferably attached to the machine by chain 68, is thrust into air opening 50 to engage a groove 69 in the lower piston 55.

Summary of operation (Figs. 1 to 8 inclusive): The machine is placed on the top of a milk can, as shown in Figs. 1 and 4, and with the tubes 12, 12ª crimped in the rings 62. The pump is given several strokes in order to partially exhaust the air from the milk can, the vibrator valve being held up by putting the pin 67 into slot 69 so that the vacuum will not be cut off from the teat cups even if the vacuum above the pump piston should be destroyed. The udder attachments are then applied to the cows and will be held in place by the vacuum developed in the apparatus. The operator then reciprocates the pump (after removing pin 67) and for each exhausting stroke milk is withdrawn from the cows and delivered into the milk can. The exhaust takes place on the down stroke of the piston, which is the stroke requiring the more force, so that the operator can use his weight advantageously in the milking operation. Moreover, the milk can is not lifted or disturbed during the exhausting stroke as might be the case if the exhaust took place at the upward stroke of the pump. The exhausting strokes may be slow or fast, long or short and at longer or shorter intervals apart so that the operation of the machine can be accurately adjusted for the particular cow operated on, which is an important consideration as some cows are more sensitive than others and some are much harder to milk than others. The operator has before him the dial of the vacuum gauge 38 enabling him to know just what suction is being applied to the cow. If, through inadvertence, the vacuum in the apparatus exceeds the danger point for which safety valve 39 is set, the latter acts immediately to reduce the vacuum.

On the down or exhaust stroke of the piston valve 51 is raised by the vacuum developed in the pump cylinder, and air flows through the exhaust conduit in which this valve is located from the milk can to the pump cylinder. At the same time the double piston valve 55, 56 in the vibrator conduit is raised from the position shown in Fig. 1 to that shown in Fig. 3, and the milk conduit is put into communication with the interior of the milk can. The vacuum in the can induces a suction through the milk conduit and teat cup cluster which draws the milk from the cow into the can. As soon as the operator reverses the pump by lifting on handle 32 the pressure in the pump cylinder above the piston is increased by compression, any excess air being expelled around the leather 31 of the piston, and this increase of pressure, relative to the pressure in the milk can, operates on the upper and larger piston 56 of the vibrator valve and on the exhaust valve 51 to cause these valves to drop to their normal positions. Gravity, of course, aids in the return movements of the valves. During the return stroke of the pump the valve 51 acts as a check valve to hold the vacuum in the milk can while the vibrator valve 55, 56 assumes a position in which it closes communication between the milk conduit and milk can and opens the milk conduit to the outside atmosphere. The fact that the milk conduit is opened to the atmosphere between each suction impulse has the advantage of insuring complete relief of the cow's udder between each suction impulse, preventing back pressure which with some types of milking machines tends to disengage the teat cups, and makes it impossible for milk vapors to be forced from the pump into the teat cups. The valves are both floating valves, without springs, and operate wholly by pressure and gravity. This makes the machine very positive and reliable in its action besides simplifying cleaning and repair. The operation of the vibrating valve being dependent upon the operation of the pump, the application of the suction to the cow is entirely within the control of the milker. The lower cylinder 55 of the vibrator valve is preferably made long enough so that it partly covers the milk orifice 70 when the valve is in its lower position. This is desirable since if the air enters the teat cups too quickly there is a tendency of the milk to be ejected in small quantity through the air opening 50.

From inspection of Fig. 11 it will be seen that the hand machine may be, with very little trouble, converted into a machine operated by a power pump. The pump, together with head 27 and the upper pipe sections 34, 45, are removed from the apparatus and the lower pipe sections 36, 47 are connected by pipes 67 with a cross pipe 68 connected by a tube or pipe 69 with the exhaust pump 70, the piston 71 of which is shown as operated by the mechanism indicated at 72. The milking operation is exactly the same as in the case of the hand machine except that the flexibility of control which is a feature of the hand milking machine is not possible with the power machine.

As it is realized that the principles of this invention might be embodied in a machine structurally different from that shown and described, I desire to cover all modifications of the apparatus disclosed which come within the scope of the appended claims.

I claim:

1. In a milking machine, the combination with a milk receptacle and a milk conduit arranged to discharge into said receptacle, of an exhausting pump having a reciprocating element and valves operated by the pump and movable responsively to the movements of the reciprocating element thereof for controlling communication between the pump and receptacle and for putting the milk conduit alternately into communication with the receptacle and with the outside atmosphere.

2. In a milking machine, the combination with a milk receptacle and a milk conduit arranged to discharge into said receptacle, of an exhausting pump having a reciprocating element and valves operated by the pump and movable responsively to the movements of the reciprocating element thereof for controlling communication between the pump and receptacle and for putting the milk conduit alternately into communication with the receptacle and thereafter closing communication between said elements and admitting air to the milk conduit.

3. In a milking machine, the combination with a milk receptacle and a milk conduit arranged to discharge into said receptacle, of an intermittently operating exhausting pump and valves operated by suction impulses produced by the pump for controlling communication between the pump and receptacle and for putting the milk conduit alternately into communication with the receptacle and with the outside atmosphere.

4. In a milking machine, the combination with a milk receptacle and a milk conduit arranged to discharge into said receptacle, of an exhausting pump and floating valves operated by suction produced by the pump one for controlling communication between the pump and receptacle and the other for putting the milk conduit alternately into communication with the receptacle and with the outside atmosphere.

5. In a milking machine, the combination with a milk receptacle and a milk conduit arranged to discharge into said receptacle, of an exhausting pump having alternate suction and pressure strokes and pressure moved valves subject, in each case, on one side to the low pressure of the receptacle and on the other side to the alternating suction and pressure developed by the pump.

6. In a milking machine, the combination with a milk receptacle and a milk conduit arranged to discharge into said receptacle, of a reciprocating exhausting pump having alternate suction and pressure strokes and pressure moved valves subject, in each case, on one side to the low pressure of the receptacle and on the other side to the alternating suction and pressure developed by the pump.

7. In a milking machine, the combination with a milk receptacle and a milk conduit arranged to discharge into said receptacle, of an exhausting pump, an exhausting conduit between the pump and receptacle, a valve in said conduit opened by suction developed in the pump, a vibrator conduit with which the milk conduit communicates and formed with an air inlet, and a pressure moved valve in said last named conduit which, in one position, puts the air inlet in communication with the milk conduit, closing communication between the milk conduit and receptacle, and in another position closes communication between the air inlet and milk conduit and puts the latter in communication with the receptacle.

8. In a milking machine, the combination with a milk receptacle and a milk conduit arranged to discharge into said receptacle, of an exhausting pump, an exhausting conduit between the pump and receptacle, a valve in said conduit opened by suction developed in the pump, a vibrator conduit with which the milk conduit communicates and formed with an air inlet, and a pressure moved valve in said last named conduit comprising two pistons and a connecting stem which, in one position, puts the air inlet in communication with the milk conduit, closing communication between the milk conduit and receptacle, and in another position closes communication between the air inlet and milk conduit and puts the latter in communication with the receptacle.

9. In a milking machine, the combination with a milk receptacle and a milk conduit arranged to discharge into said receptacle, of an exhausting pump, an exhausting conduit between the pump and receptacle, a valve in said conduit opened by suction developed in the pump, a vibrator conduit with which the milk conduit communicates and formed with an air inlet, and means comprising two valve bodies operating simultaneously which in one position puts the air inlet in communcation with the milk conduit, closing communication between the milk conduit and receptacle, and in another position closes communication between the air inlet and milk conduit and puts the latter into communication with the receptacle.

10. In a milking machine, the combination with a milk receptacle and a milk conduit arranged to discharge into said receptacle, of a pulsating exhausting pump, and means operated by the pulsation of the pump for alternately putting the pump and milk conduit in communication with said receptacle, and closing the aforesaid communications and putting the milk conduit in communication with the outside atmosphere.

11. In a milking machine, the combination with a milk receptacle and a milk conduit arranged to discharge into said receptacle, of an exhausting pump, and means operated through variations of pressure developed in the pump for alternately putting the pump and milk conduit in communication with said receptacle, and closing the aforesaid communications and putting the milk conduit in communication with the outside atmosphere.

12. In a milking machine, the combination with a milk receptacle and a milk conduit arranged to discharge into the receptacle, of a reciprocating exhaust pump having alternate exhaust and pressure strokes, and means operated on the exhaust stroke of said pump for putting the pump and milk conduit in communication with said receptacle and on the pressure stroke of said pump for closing the communications just recited and admitting air to the milk conduit.

13. In a milking machine, the combination with a milk receptacle and a milk conduit arranged to discharge into the receptacle, of a reciprocating exhaust pump having alternate exhaust and pressure strokes, and means operated on the exhaust stroke of said pump for putting the pump and milk conduit in communication with said receptacle and on the pressure stroke of said pump for closing the communications just recited and opening the milk conduit to the outside atmosphere.

14. In a milking machine, the combination with a milk receptacle and a milk conduit arranged to discharge into the receptacle, of a reciprocating exhaust pump having alternate exhaust and pressure strokes, and means operated through suction produced on the exhaust stroke of said pump for putting the pump and milk conduit in communication with said receptacle and by pressure produced on the alternate stroke of said pump for closing the communications just recited and admitting air to the milk conduit.

15. In a milking machine, the combination with a milk receptacle and a milk conduit arranged to discharge into the receptacle, of a reciprocating exhaust pump having alternate exhaust and pressure strokes, and means operated through suction produced on the exhaust stroke of said pump for putting the pump and milk conduit in communication with said receptacle and by gravity and pressure produced on the alternate stroke of said pump for closing the communications just recited and admitting air to the milk conduit.

16. A milking machine comprising a reciprocating exhausting pump, a milk conduit and a structure adapted to be placed over and in air-tight relation with a milk receptacle and formed with an exhaust conduit connecting the receptacle with the pump, a valve in said conduit which is opened by suction produced in the pump, a vibrator conduit connecting the pump and receptacle which is formed with an air inlet and with which conduit the milk conduit communicates, and a valve in said vibrator conduit subject to pressure in the pump and to pressure in the receptacle which in one position puts the milk conduit into communication with the receptacle and in another position puts the milk conduit in communication with said air inlet.

17. A milking machine comprising a reciprocating exhausting pump, a milk conduit and a structure adapted to be placed over and in air-tight relation with a milk receptacle and formed with an exhaust conduit connecting the receptacle with the pump, a valve in said conduit which is opened by suction produced in the pump, a vibrator conduit connecting the pump and receptacle which is formed with an air inlet and with which conduit the milk conduit communicates, and a double piston valve in the vibrator conduit, one piston of which, in the normal position of the valve, is between the milk conduit and receptacle and the other piston of which is between the pump and air inlet, said valve being moved on the exhaust stroke of the pump so that the first named piston is between the pump and the milk conduit and shuts off communication between the air inlet and milk conduit.

18. A milking machine comprising a reciprocating exhausting pump, a milk conduit and a structure adapted to be placed over and in air-tight relation with a milk receptacle and formed with a substantially vertical exhaust conduit connecting the receptacle with the pump, a floating valve in said conduit which is opened by suction produced in the pump, a substantially vertical vibrator conduit connecting the pump and receptacle which is formed with an air inlet and with which conduit the milk conduit communicates, and a floating valve in said vibrator conduit subject to pressure in the pump and to pressure in the receptacle which in one position puts the milk conduit into communication with the receptacle and in another position puts the milk conduit in communication with said air inlet.

19. A milking machine comprising a reciprocating exhausting pump, a milk conduit and a structure adapted to be placed over and in air-tight relation with a milk receptacle and formed with a substantially vertical exhaust conduit connecting the receptacle with the pump, a floating valve in said conduit which is opened by suction produced in the pump, a substantially vertical vibrator conduit connecting the pump and receptacle which is formed with an air inlet and with which conduit the milk conduit communicates, and a floating double piston valve in said vibrator conduit, one piston of which, in the normal position of the valve, is between the milk conduit and receptacle and the other piston of which between the pump and air inlet, said valve being moved on the exhaust stroke of the pump so that the first named piston is between the pump and the milk conduit and shuts off communication between the air inlet and milk conduit.

20. In a milking machine, the combination of a milk conduit, a structure adapted to be arranged in air-tight relation upon the milk receptacle and comprising a hand operated reciprocating pump, and means whereby on the exhaust stroke of the pump the pump and milk conduit are put into communication with the receptacle and on the back stroke of the pump the communications just recited are closed and air is admitted to the milk conduit.

21. In a milking machine, the combination of a milk conduit, a structure adapted to be arranged in air-tight relation upon the milk receptacle and comprising a hand operated reciprocating pump, and means whereby on the exhaust stroke of the pump the pump and milk conduit are put into communication with the receptacle and on the back stroke of the pump the communications just recited are closed and the milk conduit is open to the outside atmosphere.

22. In a milking machine, the combination of a milk conduit, a structure adapted to be arranged in air tight relation with a milk receptacle and comprising an exhaust pump having a hand operated reciprocating element which is moved downwardly on its exhaust stroke, and means whereby on the exhaust stroke of the pump the pump and milk conduit are put into communication with the receptacle and on the back stroke of the pump the communications just recited are closed and air is admitted to the milk conduit.

23. In a milking machine, the combination of a milk conduit and a pumping device comprising a base adapted to be placed on a milk receptacle in air-tight relation therewith, a hollow head, a pump cylinder and exhausting and vibrator pipes, the latter formed with an air inlet arranged between said head and base, and the milk conduit being connected with said vibrator pipe, a piston in said cylinder, means for reciprocating said piston, a valve in the exhausting pipe adapted to be opened by suction developed in the pump, and a double piston valve in the vibrator pipe which in one position puts the milk conduit into communication with the receptacle and in another position opens the milk conduit to the outside atmosphere.

24. In a milking machine, the combination of a milk conduit and a pumping deice comprising a circular base provided at its edge with a gasket whereby said base may be placed on a milk can in air-tight relation therewith, a hollow head, a pump cylinder and exhausting and vibrator pipes, the latter formed with an air inlet arranged between said head and base, and the milk conduit being connected with said vibrator pipe, a piston in said cylinder, means for reciprocating said piston, a valve in the exhausting pipe adapted to be opened by suction developed in the pump, and a double piston valve in the vibrator pipe which in one position puts the milk conduit into communication with the receptacle and in another position opens the milk conduit to the outside atmosphere.

25. In a milking machine, the combination with a milk conduit and milk receptacle, of mechanism for exhausting the air from the receptacle to draw milk through said conduit, and a base plate for supporting said mechanism having exhaust and milk conduit openings near its periphery and formed with its under side convex, for the purpose described.

26. In a milking machine, the combination with a milk conduit having an udder attachment and a milk receptacle, of a reciprocating pump having alternate exhaust and pressure strokes for exhausting the air from the receptacle, and means actuated by pressure developed by the pump on its pressure stroke for interrupting the action of the vacuum on the udder attachment.

27. In a milking machine, the combination with a milk conduit having an udder attachment and a milk receptacle, of a reciprocating pump for exhausting the air from the receptacle, and means actuated by pressure developed by the pump on its return stroke for interrupting the action of the vacuum on the udder attachment and putting the same into communication with the outside atmosphere.

28. In a milking machine, the combination with a milk receptacle and a milk conduit arranged to discharge into said receptacle, of an exhausting pump, an exhausting conduit between the pump and receptacle, a valve in said conduit opened by suction developed in the pump, a vibrator conduit with which the milk conduit communicates and formed with an air inlet, a pressure moved valve in said last named conduit which, in one position, puts the air inlet in communication with the milk conduit, closing communication between the milk conduit and receptacle, and in another position closes communication between the air inlet and milk conduit and puts the latter in communication with the receptacle, and means whereby said vibrator valve may be held in said last named position independently of the pressure thereon.

29. In a milking machine, the combination with a milk receptacle and a milk conduit arranged to discharge into said receptacle, of an exhausting pump, an exhausting conduit between the pump and receptacle, a valve in said conduit opened by suction developed in the pump, a vibrator conduit with which the milk conduit communicates and formed with an air inlet, a pressure moved valve in said last named conduit which, in one position, puts the air inlet in communication with the milk conduit, closing communication between the milk conduit and receptacle, and in another position closes communication between the air inlet and milk conduit and puts the latter in communication with the receptacle, and a pin adapted to be thrust through said air inlet to engage said vibrator valve when in said last named position.

30. In a milking machine, the combination with a milk receptacle and a milk conduit arranged to discharge into said receptacle, of an exhausting pump, an exhausting conduit between the pump and receptacle, a valve in said conduit opened by suction developed in the pump, a vibrator conduit with which the milk conduit communicates and formed with an air inlet, and a pressure moved valve in said last named conduit which, in one position, puts the air inlet in communication with the milk conduit, closing communication between the milk conduit and receptacle, and in another position closes communication between the air inlet and milk conduit and puts the latter in communication with the receptacle, said vibrator valve being formed so that in said first named position it throttles, without closing, the opening into said milk conduit.

PETER A. FRIMAND.